O. P. MASON.
LETTER BOX.
APPLICATION FILED SEPT. 30, 1911.
1,056,430.
Patented Mar. 18, 1913.
2 SHEETS—SHEET 1.
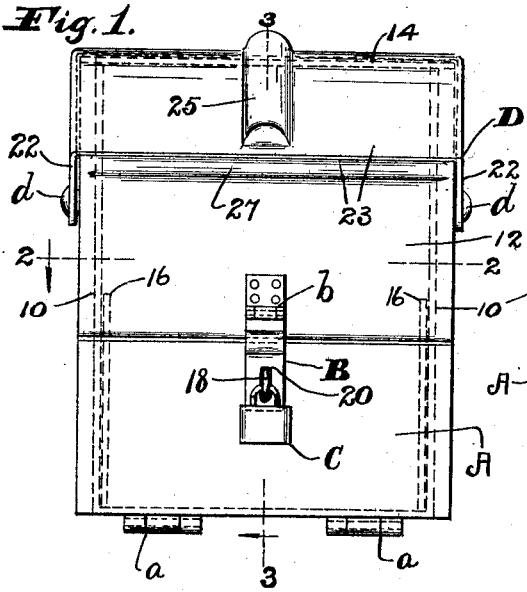
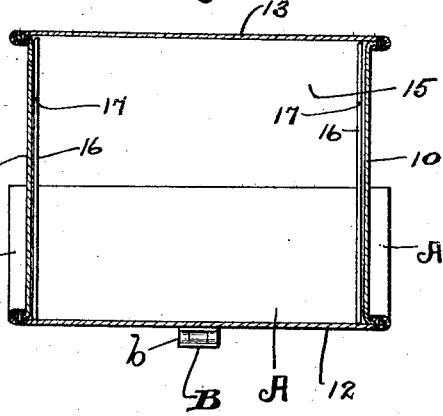
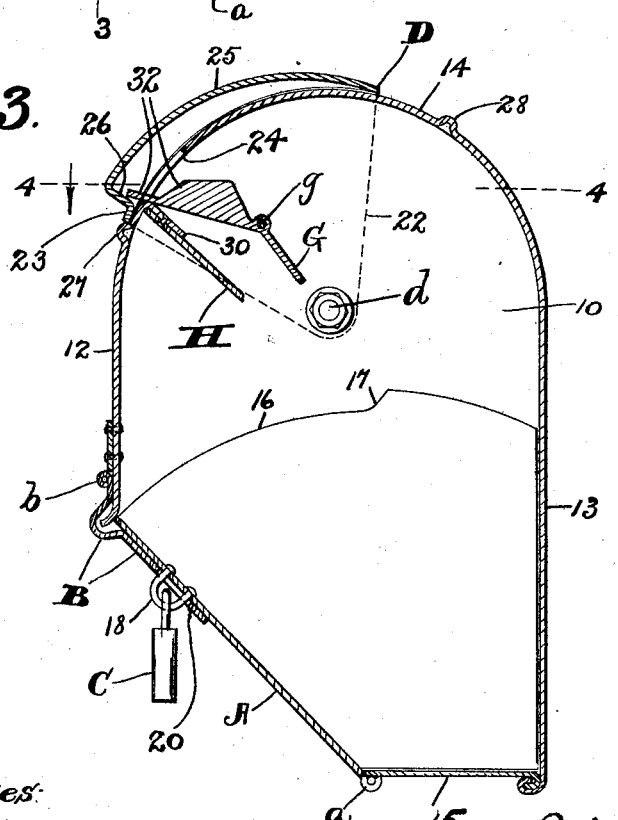
Witnesses:
H. J. Gettins.
B. C. Brown.
Inventor:
Orlando P. Mason
By
his Attorneys.

O. P. MASON.
LETTER BOX.
APPLICATION FILED SEPT. 30, 1911.
1,056,430.
Patented Mar. 18, 1913.
2 SHEETS—SHEET 2.
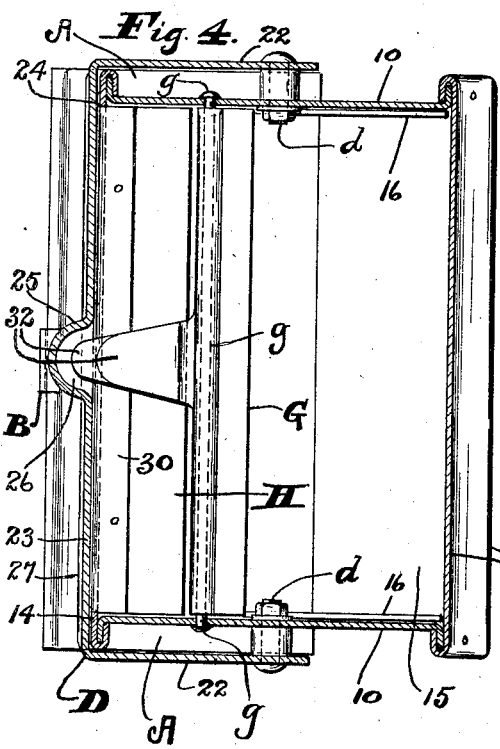
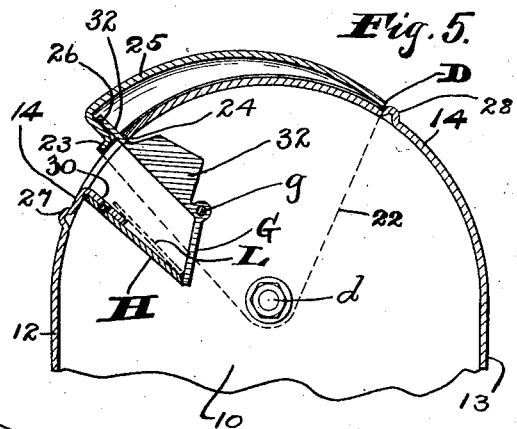
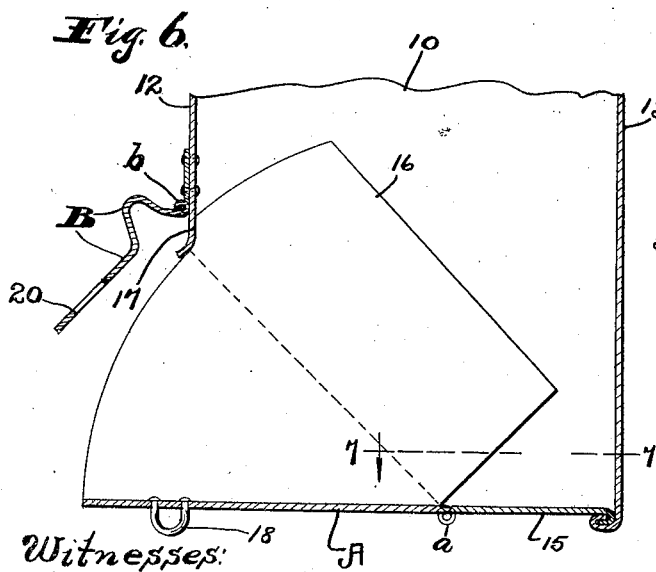
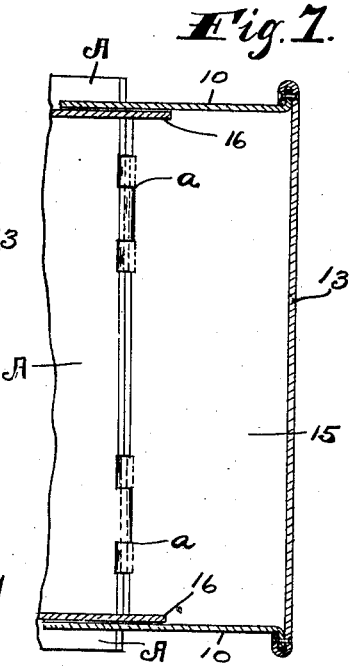
Inventor.
Orlando P. Mason

UNITED STATES PATENT OFFICE.

ORLANDO P. MASON, OF BELLAIRE, OHIO.

LETTER-BOX.

1,056,430.  Specification of Letters Patent.  Patented Mar. 18, 1913.

Application filed September 30, 1911. Serial No. 652,071.

*To all whom it may concern:*

Be it known that I, ORLANDO P. MASON, a citizen of the United States of America, residing at Bellaire, in the county of Belmont and State of Ohio, have invented certain new and useful Improvements in Letter-Boxes; and I hereby declare the following to be a full, clear, and exact description of the invention, such as will enable others skilled in the art to which it pertains to make and use the same.

This invention relates to improvements in letter-boxes.

One object of this invention is to produce a letter-box which can be readily and inexpensively enameled externally.

Another object is to produce a letter-box which is simple and durable in construction.

Another object is to provide simple and reliable means whereby the purloining of letters from the box at the letter-receiving aperture of the box is successively prevented.

With these objects in view, and to the end of attaining any other advantage hereinafter appearing, this invention consists in certain structural features, and combinations and arrangements of parts, hereinafter described, pointed out in the claims, and illustrated in the accompanying drawings.

In the said drawings, Figure 1 is a front view of a letter-box embodying my invention. Fig. 2 is a horizontal section on line 2—2, Fig. 1, looking downwardly. Fig. 3 is a central vertical section on line 3—3, Fig. 1, looking in the direction indicated by the arrow. Fig. 4 is a horizontal section on line 4—4, Fig. 3, looking downwardly. Fig. 5 is a central section corresponding with the upper portion of the view shown in Fig. 3, except that in Fig. 5 the movable cover for the letter-receiving aperture of the box is shown in its rearwardly swung or open position. Fig. 6 is a central section corresponding with the lower portion of the view shown in Fig. 3, except that in Fig. 6 the delivery-door of the letter-box is shown in its open position. Fig. 7 is a horizontal section on line 7—7, Fig. 6, looking downwardly. Figs. 3, 4, 5, 6 and 7 are drawn on a larger scale than Figs. 1 and 2.

Referring to said drawings, 10 and 10 indicate the two laterally spaced vertically arranged and parallel sides of the depository receptacle of my improved letter-box. 12 represents the vertically arranged upper portion of the front of said receptacle; 13, the vertically arranged back of the receptacle, and 14, the top of the receptacle, which top is arched from the front to the back of the receptacle.

A indicates the delivery-door of the receptacle. Said door forms the lower portion of the front of the receptacle and is hinged, as at $a$, to the bottom 15 of the receptacle and shown closed in Figs. 1, 2 and 3. Said door is provided with two laterally spaced wings 16 which project rearwardly into the receptacle in close proximity to the sides of the receptacle. Said wings are provided with forwardly facing shoulders 17 arranged to abut against the inner side of the upper portion 12 of the front of the receptacle in the fully open position of the door, as shown in Fig. 6. The upper portion of the door A is provided with a staple 18 which in Figs. 1 and 3 is shown projecting forwardly through a slot 20 formed in a hasp B which is hinged, as at $b$, to the front of the receptacle. A padlock C is shown hung on the staple 18, in Figs. 1 and 3, forwardly of the hasp B and employed in locking the delivery-door in its closed position.

A bail-shaped cover D straddles the upper portion of the depository receptacle and has its end portions 22 arranged opposite and externally of the sides 10 of the receptacle and pivoted horizontally, as at $d$, to said sides centrally between the back 13 and the upper portion 12 of the front of the receptacle. The central portion 23 of said cover is arranged externally of the top 14 and extends from side to side of the receptacle. Said cover is normally in its forward position in which it covers the letter-receiving aperture 24 of said receptacle, which aperture is formed in the forward portion of the top 14. Said cover is shown in its forward and normal position in Figs. 1, 3 and 4, and uncovers the aperture 24 during the swinging of the cover rearwardly into its open position shown in Fig. 5. The top 14 is curved concentrically relative to the axis of the cover D, and the central portion 23 of said cover curves circumferentially of said top but has an outwardly offset portion 25 arranged centrally between the end portions 22 of the cover, which offset portion extends rearwardly from the forward end of the cover and is preferably deepest radially of the cover at said end and gradually reduces in depth radially toward the rear end of the cover. The cover D is provided at the forward end and internally of its offset portion 25 with a shoulder 26 which faces in the direction of the rear end of said offset portion. The depository receptacle is provided externally and below but in proximity to the aperture 24 with a rib 27 which forms a stop arranged to limit forward movement of the cover D. Said receptacle is provided externally of its top 14 and a suitable distance rearwardly of the aperture 24 with a rib 28 which forms a stop arranged to limit the rearward swinging of the cover D. It will be observed that said cover has the greatest weight thereof arranged forward of the axis of the cover so that gravity acts to retain said cover in its forward and aperture-covering position, and that by the provision of the depository receptacle with the ribs 27 and 28 the stops for limiting the movement of the cover D are inexpensively formed.

My improved letter-box also comprises improved means for preventing the purloining of letters from the box through the aperture 24, which means comprise a shutter G arranged internally and extending from side to side or transversely of the depository receptacle. The shutter is also arranged between the aperture 24 and the axis of the cover D and rearwardly of a downwardly and rearwardly projecting apron H arranged internally of the receptacle and below said aperture. The apron H extends approximately from side to side of said receptacle and the top 14 is provided at the bottom of the aperture 24 with a rearwardly and downwardly projecting flange 30 arranged internally of the receptacle. The apron H overlaps the under side of and is suitably secured to and rigid with the flange 30 which extends approximately from side to side of the receptacle. The shutter G is journaled upon a horizontally arranged pivotal rod $g$ which is parallel with the axis of the cover D. The rod $g$ is arranged substantially centrally between the aperture 24 and the axis of the cover D and spaced from the apron H and supported from the sides 10 of the receptacle. It will be observed therefore that the shutter G has its axis arranged above and spaced from the rear end of the apron H, that said shutter in its rearwardly swung position projects rearwardly and downwardly, as shown in Figs. 3 and 4, and is spaced far enough from the apron to permit a letter delivered to the apron to pass downwardly between the apron and the shutter, and that said shutter in its last-mentioned position is arranged to be swung forwardly into a position obstructing the downward passage of said letter from the apron, as shown in Fig. 5, in which a letter L is shown in dotted lines delivered to said apron, which letter rests on said apron and against the forward side of said shutter. The shutter G is provided at its axis and centrally between its ends with a forwardly projecting poise 32 which extends to and overlaps and abuts against the shoulder 26 hereinbefore referred to. The relative arrangement of the parts is such that the shutter G is, when the cover D is in its aperture-covering or forward position, spaced rearwardly from the apron H and projects downwardly and rearwardly toward the axis of the cover, and the poise 32 acts to retain the shutter in its rearwardly swung position, shown in Figs. 3 and 4. During the actuation of the cover D from its forward position, shown in Figs. 1 and 4, into its rearwardly swung position, shown in Fig. 5, the shoulder 26 actuates said poise in the direction required to swing the shutter G into its forward position, shown in Fig. 5. The relative arrangement of the parts is furthermore such that in the rearward position of the cover D the compartment formed between the closed shutter G and the aperture 24 and between the apron H and the poise 32 is large enough in dimensions to receive the largest piece of mail-matter for which the letter-box is designed. Obviously during the return of the cover D by gravity from its rearward position, shown in Fig. 5, into its forward position, the shutter G is swung by the action of the poise 32 into its rearward and open position as shown in Fig. 3, and obviously during such movement of said shutter the letter or mail-matter L shown in dotted lines, Fig. 5, passes downwardly by gravity off the apron.

What I claim is:—

1. In a letter-box, the combination, with a receptacle having a top arched from the front to the back of the receptacle, which top is provided in its forward portion with a letter-receiving aperture, and a bail-shaped cover straddling the upper portion of the receptacle and pivoted to the sides of the receptacle, which cover in its normal position covers said aperture and is arranged to be swung rearwardly, the central portion of the cover having an outwardly offset portion extending forwardly and rearwardly of the cover and being provided at the forward end and internally of said offset portion with a shoulder which faces in the direction of the rear end of said offset portion, of an apron supported from the receptacle and arranged below the aforesaid aperture and projecting downwardly and rearwardly into the receptacle, and a pivotally supported shutter arranged within and extending transversely of the receptacle and located rearwardly of the apron, which shutter in its normal position is spaced far enough from the apron to permit a letter to pass from the apron downwardly between the apron and the shutter, but arranged to be swung forwardly into a position obstructing the downward passage of said letter from the apron, said shutter being provided with a forwardly projecting member which extends to and overlaps the aforesaid shoulder.

2. In a letter-box, the combination, with a receptacle having a top arched from the front to the back of the receptacle, which top is provided in its forward portion with a letter-receiving aperture, and a bail-shaped cover straddling the upper portion of the receptacle and pivoted to the sides of the receptacle, which cover in its normal position covers said aperture and is arranged to be swung rearwardly, the central portion of the cover being curved circumferentially of said top and having a forwardly and rearwardly extending outwardly offset portion, the cover being provided at the forward end and internally of said offset portion with a shoulder which faces in the direction of the rear end of said offset portion, of an apron supported from the receptacle and arranged below the aforesaid aperture and projecting downwardly and rearwardly into the receptacle, and a pivotally supported shutter arranged within the receptacle and located rearwardly of the apron, which shutter in its normal position is spaced far enough from the apron to permit a letter to pass downwardly from the apron between the apron and the shutter but arranged to be swung forwardly into a position obstructing the downward passage of said letter from the apron, said shutter being provided at its axis with a forwardly projecting poise which overlaps the aforesaid shoulder and acts to retain the shutter in its rearwardly swung position.

In testimony whereof, I sign the foregoing specification, in the presence of two witnesses.

ORLANDO P. MASON.

Witnesses:
B. C. BROWN,
N. L. McDONNELL.

---

Copies of this patent may be obtained for five cents each, by addressing the "Commissioner of Patents, Washington, D. C."